(No Model.)
J. J. SCHMITT.
TANNING APPARATUS.
No. 260,613. Patented July 4, 1882.
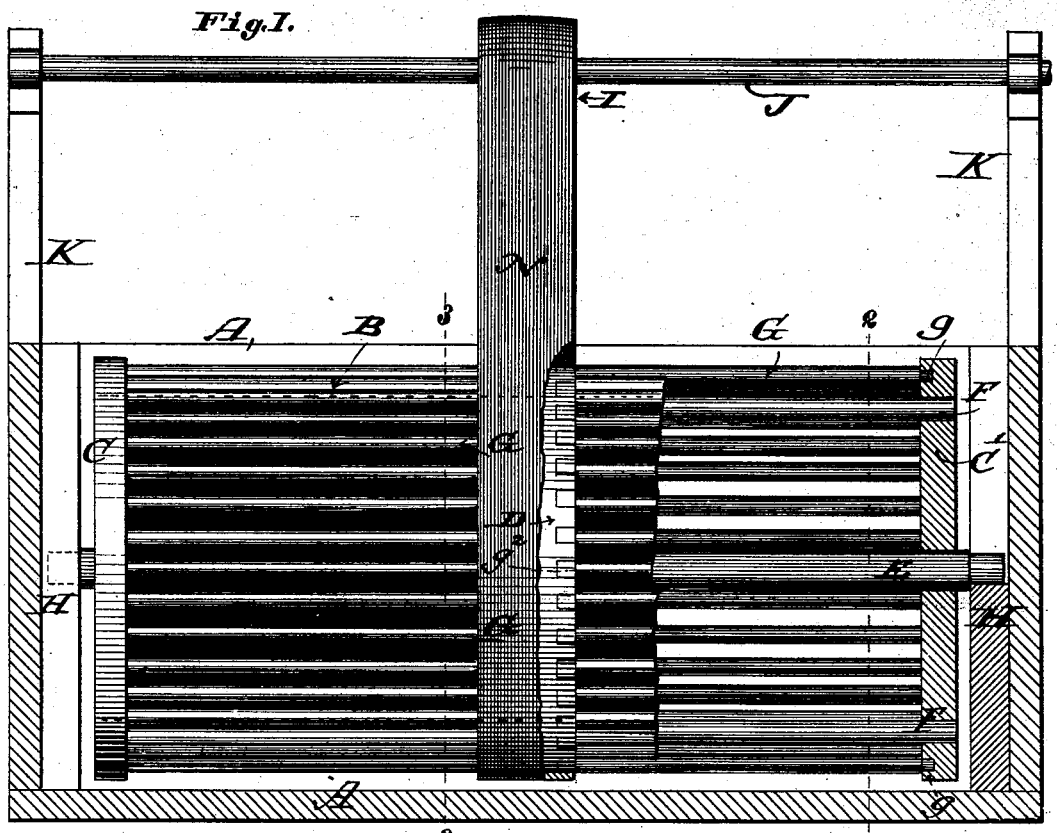
Fig. 1.
Fig. 2.
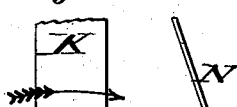
Fig. 3.
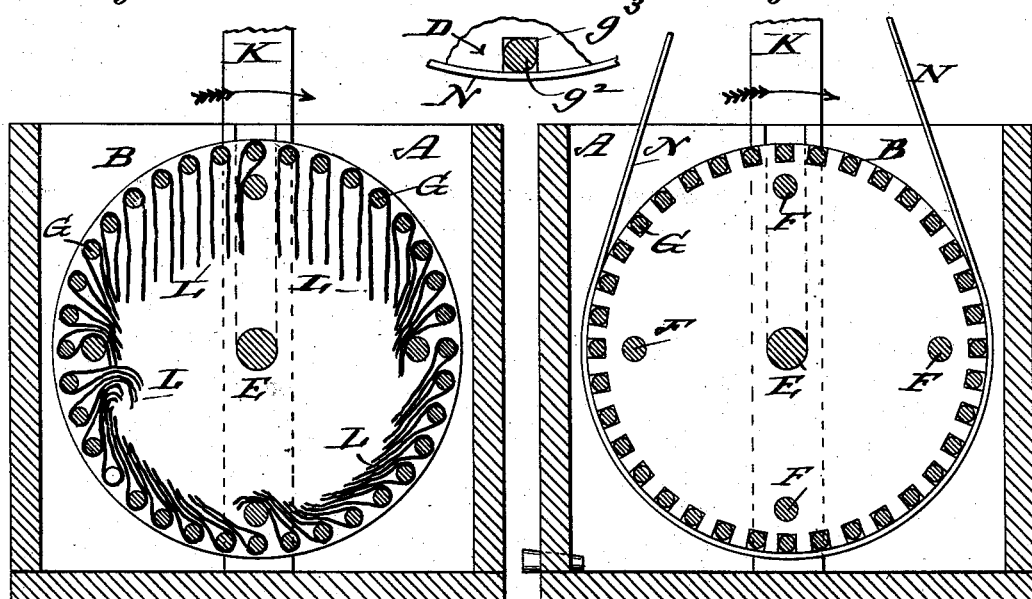
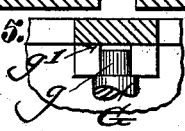
Fig. 5.
Attest:
Saml. S. Boyd
Charles Pickles
Inventor:
Julius J. Schmitt
by C. D. Moody, atty.

UNITED STATES PATENT OFFICE.

JULIUS J. SCHMITT, OF ST. LOUIS, MISSOURI, ASSIGNOR TO GEORGE E. SCHMITT, OF SAME PLACE.

TANNING APPARATUS.

SPECIFICATION forming part of Letters Patent No. 260,613, dated July 4, 1882.

Application filed April 22, 1882. (No model.)

*To all whom it may concern:*

Be it known that I, JULIUS J. SCHMITT, of St. Louis, Missouri, have made a new and useful Improvement in Tanning Apparatuses, of which the following is a full, clear, and exact description, reference being had to the annexed drawings, making part of this specification, in which—

Figure 1 is a vertical section taken through a tanning-vat having the improved apparatus, the wheel and also the belt being partly broken away to exhibit the interior construction; Fig. 2, a vertical section taken on the line 2 2 of Fig. 1; Fig. 3, a vertical section taken on the line 3 3 of Fig. 1; Fig. 4, a detail, and Fig. 5 a detail.

The same letters denote the same parts.

The present invention is an improvement in devices for agitating the hides in the liquor while being tanned.

It consists in a wheel held and arranged to rotate in a tanning-vat, the wheel being constructed to admit the tanning-liquor freely within it, and being provided with a series of bars, upon which the hides to be tanned are hung, the bars being arranged longitudinally in the wheel at or near its surface, and made detachable therefrom, as seen in the drawings, where—

A represents a tanning-vat suitable for containing the usual tanning-liquor.

B represents a wheel, consisting of the end pieces or disks, C C', a central disk, D, and a shaft, E. The construction may be strengthened by means of the bars F F, which serve to connect and brace the disks.

G G represent a series of bars, inserted in the disks at or near their peripheries. The shaft E is supported in the bearings H H, and so that the wheel can be rotated in the vat.

N represents a driving-belt passing around the central disk, D, and over a suitable driving-pulley, I, upon the shaft J. The latter is supported by suitable supports, K K.

The bars G G, at one end, are provided with tenons $g$, which, when the bars are in the wheel, are inserted in sockets $g'$ in the disks C C'. The other ends, $g^2$, of the bars are held in mortises $g^3$ in the central disk, D. The ends $g^2$ are preferably squared, coming, when dropped into the mortises, flush with and forming part of the surface of the disk D. The bars G G are thus detachable from the wheel, and in practice the hides L L are hung upon the bars, and the bars then inserted in their places in the wheel. The bars can be inserted at the top of the wheel as it is rotated, the belt N serving to keep the bars in their places as the wheel turns around.

The rotation of the wheel is effected by means of the belt N, and at a suitable rate for properly agitating the hides in the tanning-liquor.

The wheel is intended to be submerged in the liquor, enabling the wheel to be easily rotated. When tanned the most convenient mode of withdrawing the hides from the wheel and vat is by means of the bars G G, the latter, with the hides upon them, being lifted out of the wheel from the upper part thereof.

In place of the three disks C, C', D, two may be used, D and C or C'. The vat A also may be of sufficient size to enable the hides L L, in place of hanging inwardly into the wheel, as shown, to hang from the bars G G outwardly from the outer side of the wheel.

I claim—

1. The combination, in the vat A, of the shaft E, the disks C D, and the bars G, the latter being detachable from the disks, for the purpose described.

2. The combination of the vat A, the shaft E, the disks D C, the detachable bars G, and the belt N, substantially as described.

3. The combination of the vat A, the wheel B, the belt N, the pulley I, the shaft J, and the standards K K, substantially as described.

4. The combination of the vat A, the wheel B, having the end disks, C C', and the central disk, D, the detachable bars G, and the belt N, substantially as described.

JULIUS J. SCHMITT.

Witnesses:
C. D. MOODY,
SAML. S. BOYD.